Jan. 24, 1967 B. P. LEMRICK 3,299,569

TOMATO PLANT HOUSING SUPPORT

Filed Oct. 11, 1965

BARTON P. LEMRICK INVENTOR.

BY George R. Nimmer
ATTORNEY

United States Patent Office 3,299,569
Patented Jan. 24, 1967

3,299,569
TOMATO PLANT HOUSING SUPPORT
Barton P. Lemrick, Percival, Iowa 51648
Filed Oct. 11, 1965, Ser. No. 494,371
4 Claims. (Cl. 47—45)

This invention relates to housings for supporting growing bushy plants of the type which bears relatively heavy fruit such as tomatoes, squash, cucumbers, etc. In particular, this invention relates to a plant housing support having a configuration that is especially adapted to lend both sideward and base support for heavy fruit-laden bushy plants, said housing being admirably well suited for economical manufacture and for nestable packing, storage, and shipment.

Many garden plants grown for their edible products tend to spread over a large area unless their growth is controlled and confined to a certain predetermined direction, preferably vertical. Controlled vertical growth not only results in the use of a minimum of ground space per plant, but makes for easier cultivation and irrigation and facilitates access to the plant for necessary operations such as pruning, spraying, picking, etc. In the cases of heavier fruits e.g. tomatoes, vertical support of the plant results in higher yields per plant and in a higher quality fruit having a low incidence of rotting and bruising.

Many plant housings of the prior art are unsuitably constructed for lending the necessary sideward and base support for bushy fruit-laden plants and make no provision for containing the branchedly convergent later growth of the plant. Further, other prior art structures lack the stability equired under adverse weather conditions such as the stress of wind and rain. Moreover, prior art plant housings are not amenable to the economics of nestable packing, storage, and shipment, but rather the prior art workers have attempted to attain these economic ends with collapsible structures which inherently detracts from the rigid stability required for plant housing devices.

It is accordingly an object of the present invention to provide a practical and inexpensive means for controlling the direction of growth of and for providing both lower and sideward support for a bushy heavy plant, both during infant and mature growth stages of the plant.

It is another object of the present invention to provide a plant housing device that is capable of manufacture at low cost.

It is another object of the present invention to provide a plant housing device that may be readily, simply, and stably, and yet removably, embedded into the earth.

It is yet another object to provide a plant housing device that may be nested one within another to economically conserve space during transportation, storage, and marketing, and readily removed from the nested configuration for subsequent use.

With these and other objects in view, which will appear as the description proceeds, the invention resides in the novel construction, combination, and arrangement of parts hereinafter as described, and more particularly as pointed out in the appended claims, reference being had to the accompanying drawings wherin like numbers refer to like parts in the several views, and in which:

Figure 1:
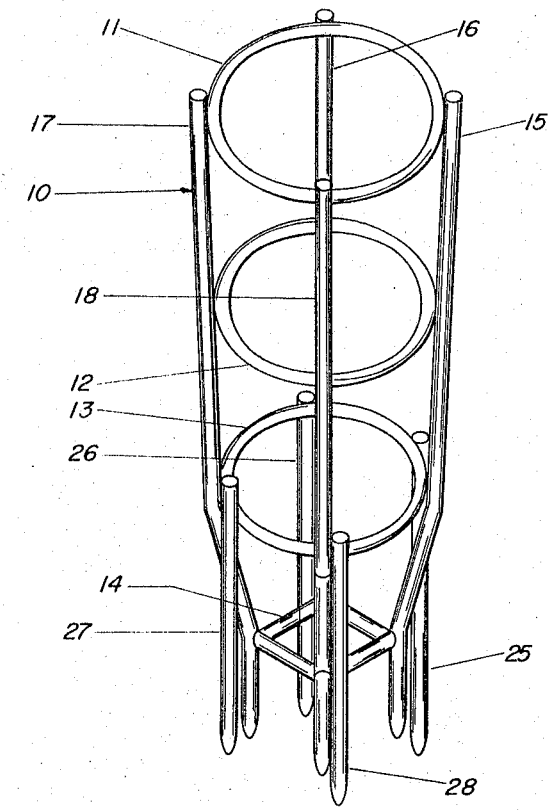
FIGURE 1 is a perspective view of the general form of the tomato plant housing device of the present invention.

The tomato plant housing device 10 comprises a plurality of hoop-like shallow frames 11, 12, 13, and 14, said thin frames being vertically aligned and each of said frames being substantially horizontally disposed. The upper three frames 11–13 are of geometrically similar cross-sectional shape and preferably of circular ring configuration as shown. While the lowest or base frame 14 may be circular, ellipsoid, polygonal, or of other annular shape, for reasons to be explained later, base frame 14 is more desirably polygonal and preferably regularly rectangular i.e. square. The dimensional size of the respective frames progressively decreases from the uppermost frame 11 to the lowermost base frame 14 to give the device 10 an upwardly flared configuration so as thus to render the housing aptly capable of supporting branched plant growth.

Frames 11–14 are rigidly spaced apart in a substantially parallel relationship with a plurality of side rods 15–18, each of which is attached, as by welding or separate fasteners, to each of the respective frames. Side rods 15–18 are spaced at substantially equal angular intervals about the vertical central axis of the housing, herein at 90° angles, so as to provide a peripheral sideward support for an inwardly contained tomato plant (not shown). The upper portions of the respective side rods i.e. that portion disposed between uppermost frame 11 and next lowest frame 13, are substantially linear and converge downwardly and inwardly. The degree of inward convergence for the side rods upper portions is determined, of course, by the progressively decreasing dimensional size of the several frames 11–13.

The dimensional size of lowest base frame 14 is markedly smaller than that of next lowest frame 13, and those portions of the side rods 15–18 between frames 13 and 14 have a greater degree of inward convergency than do those upper portions of the side rods which are above frame 13. These highly convergent intermediate portions of rods 15–18 between frames 13 and 14 support the major weight of the tomato plant, said weight being especially considerable for fruit-laden mature plants. In order to properly support the mature tomato plant above the ground, the highly convergent intermediate portions of side rods 15–18 between frames 13 and 14 should have an angular relationship with lowest base frame 14 of not more than about 75°. The four rods 15–18 are respectively attached at the respective four corners of the square base frame 14, for reasons to be explained later.

The lowest portions 15a–18a of side rods 15–18 extend vertically below the respective corners of lowest base frame 14, and said downwardly-extending lowest portions are all substantially parallel to each other and of substantially equal lengths so that the housing 10 may be readily vertically implanted into the earth. Preferably, the lowest extremity of each side rod is sharpened to facilitation said implantation.

Figure 2:
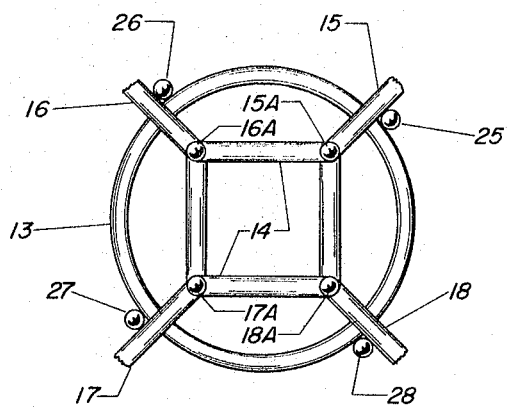
FIGURE 2 is a bottom plan view of the tomato plant housing device of the present invention.

There is a plurality of auxiliary ground stakes 25–28 that extend vertically downwardly from housing 10 outwardly of the lowest portions 15a–18a of side rods 15–18. As shown in FIGURES 1 and 2, the respective auxiliary ground stakes 25–28 are vertically attached as by welding to next lowest frame 13, one stake immediately adjacent to each side rod. For example, stake 25 is adjacent to side rod 15, stake 26 is adjacent to side rod 16, stake 27 is adjacent to side rod 17, and stake 28 is adjacent to side rod 18. Preferably, auxiliary ground stakes 25–28 are parallel to and are coextensive with the lowest extremity of the several side rods to facilitate vertical implantation of housing device 10 into the earth. In this vane, the lowest extremity of each ground stake is sharpened to promote penetration into the earth. The ground stakes 25–28, which are spaced at equal angular intervals about the housing 10, lend stability to the device so as to maintain housing 10 and the surrounded tomato plant vertically upright even under adverse weather conditions.

Figure 3:
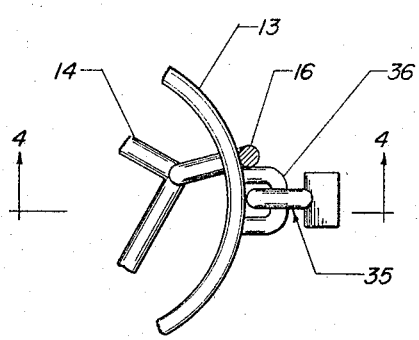
FIGURE 3 is a top plan view of the preferred removable type outward ground stake for the tomato plant housing.
Figure 4:
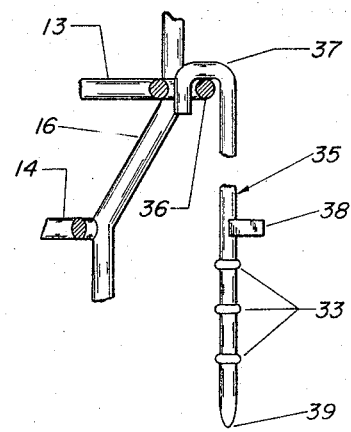
FIGURE 4 is a sectional elevational view taken along line 4—4 of FIGURE 3.

A primary problem attendant with the plant housing structures of the prior art is the difficulty in storing, packing, and shipping the structures. Although certain of the prior art structures are designed to be collapsible in order to surmount these difficulties, a collapsible structure by its very nature lacks rigidity and is inherently difficult to assemble and erect. The housing device of the present invention, especially when having the ground stakes of FIGURES 3 and 4, is particularly amenable to nestable packing for economical storage and shipment. The embodiment of FIGURES 3 and 4 is in all respects identical to that of FIGURES 1 and 2 except for the feature of the novel removably attachable ground stakes e.g. 35. An outwardly extending eyelet e.g. 36, is attached to next lowest frame 13 adjacent to each side rod e.g. 16. The upper end of ground stake 35 is provided with a hooked portion 37 and with an outwardly extending horizontal flange 38. The distance between hooked portion 37 and flange 38 is substantially equal to that between lowest base frame 14 and next lowest frame 13, but in no event greater than said distance. After the lowest portions 15a–18a of side rods 15–18 have been embedded into the earth so that base frame 14 abuts the earth surrounding the young tomato plant, the hooked portion of each auxiliary ground stake e.g. 35, is removably engaged with an eyelet e.g. 36. This operation is performed by the operator pressing upon the outward flange e.g. 38, with the foot to embed the sharpened end 39 into the earth to the extent where the flange 38 abuts the earth. Thus, the vertical ground stakes are supported in the upright position by the lateral flange e.g. 38, so that the four identical removable ground stakes are able to provide a secure support for the housing.

The upwardly flared nature of the housing enables several such housings to be nestably packed in vertical fashion, one inside the other. Contributing markedly to the nestability is the increased convergency of the side rods 15–18 between base frame 14 and next lowest frame 13, as well as the removability feature of the ground stakes embodiment 35. However, the essential feature which makes nestability possible is the polygonal geometric shape for base frame 14. If, for example, the base frame 14 were of circular configuration, the lowest vertical portions of the side rods from the upper housing device would abut against the base frame of the next lower housing device and prevent proper nesting of the two. However with a polygonal base frame and with the side rods extending downwardly from a corner of each, the lower terminii of the side rods will clear the base frame of the next lower housing unit provided the corners of the several base frames are not in vertical alignment. Specifically, if square base frames are employed, the several housing units of the nested structure should be rotated about 45° with respect to the adjacently nested unit. Thus, the corners of the respective base frames are staggered i.e. not vertically aligned, and the terminii of the side rods will clear and extend below the base frame of the next lower unit of the multi-unit nested pile.

As best illustrated in the FIGURE 4 sectional elevational view, there is desirably a plurality of integral annular ribs spaced along the lower portions of each ground stake. These integral annular ribs 33 firmly anchor the respective ground stakes into the earth, and insure stability of housing 10 especially under moist soil conditions. For the sake of clarity in presenting the FIGURE 1 perspective view, this desirable optional feature has been omitted in ground stakes 25–28.

From the foregoing, the construction and operation of the tomato plant housing device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:
1. A plant support comprising at least three vertically aligned shallow hollow frames, said frames being rigidly spaced apart with a plurality of downwardly convergent side rods attached to the respective frames, the portions of the respective side rods between the lowest base frame and the next lowest frame immediately thereabove having a greater degree of convergency than those portions of the side rods disposed above the next lowest hollow frame, the lowest portions of said side rods below the lowest frame being substantially vertical, and a plurality of substantially vertical auxiliary ground rods attached to the plant support, said auxiliary ground rods extending downwardly from said plant support and being disposed outwardly of the lowest portions of said side rods.

2. A plant support housing comprising at least three vertically aligned shallow hollow frames, each of said frames being substantially horizontally disposed and being rigidly spaced apart with a plurality of downwardly convergent side rods attached to each of the respective frames, those portions of the respective side rods between the lowest base frame and the next lowest frame immediately thereabove having a greater degree of convergency than those portions of the side rods disposed above the next lowest hollow frame, the lowest portions of said side rods below the lowest base frame extending vertically downwards therefrom, and a plurality of substantially vertical ground stakes attached to the next lowest frame at substantially regular intervals therearound, said auxiliary ground stakes extending downwardly from said next lowest frame and being disposed outwardly of the lowest portions of said side rods.

3. A tomato plant support comprising at least three vertically aligned concentric shallow horizontal frames, the dimensional size of the respective frames progressively decreasing from the uppermost to the lowest frame, the lowest base frame being the dimensionally smallest frame and being of regularly rectangular configuration, said frames being rigidly spaced apart in a substantially parallel relationship with at least four regularly spaced downwardly-convergent side rods attached to the respective frames and at the four corners of the base frame to give the plant support an upwardly flared configuration, those portions of the respective side rods between the lowest base frame and the next lowest frame immediately thereabove having a greater degree of convergency than those portions of the side rods disposed above the next lowest hollow frame, the lowest portions of said side rods below the lowest base frame extending vertically downwardly from the corners of the rectangular base frame and being of substantially equal lengths, and a plurality of outwardly extending eyelets integrally attached to the next lowest frame, each of said eyelets being adapted to engage an auxiliary ground stake, each auxiliary ground stake having a hooked portion at the upper end for engaging an eyelet and an outwardly extending integral flange that is spaced below the hooked portion a distance substantially equal to that between the base frame and the next lowest frame immediately thereabove.

4. A plant support housing comprising at least three vertically aligned shallow hollow frames, each of said frames being substantially horizontally disposed and being rigidly spaced apart concentrically with a plurality of downwardly convergent side rods attached to the respective frames to provide an upwardly flared housing, those intermediate portions of the respective side rods between the lowest base frame and the next lowest base frame having a greater degree of convergency than those portions of the side rods disposed above the next lowest frame, said intermediate portions having an angular relationship of not more than 75° with respect to the lowest base frame, the lowest portions of said side rods below the lowest base frame extending vertically downwards therefrom, and a plurality of substantially vertical ground stakes removably attached to the next lowest frame at substantially regular peripheral intervals, each of said ground stakes having integral annular rings to facilitate anchoring of said stakes into the earth.

References Cited by the Examiner

UNITED STATES PATENTS

| | | | |
|---|---|---|---|
| 1,617,494 | 2/1927 | Nuckols | 47—47 |
| 3,088,245 | 5/1963 | Menge | 47—47 |
| 3,174,255 | 3/1965 | Knell | 47—45 |

ABRAHAM G. STONE, *Primary Examiner.*

R. CARTER, *Assistant Examiner.*